March 15, 1927.  F. W. BULL  1,620,945
SHOCK ABSORBER
Filed May 17, 1926
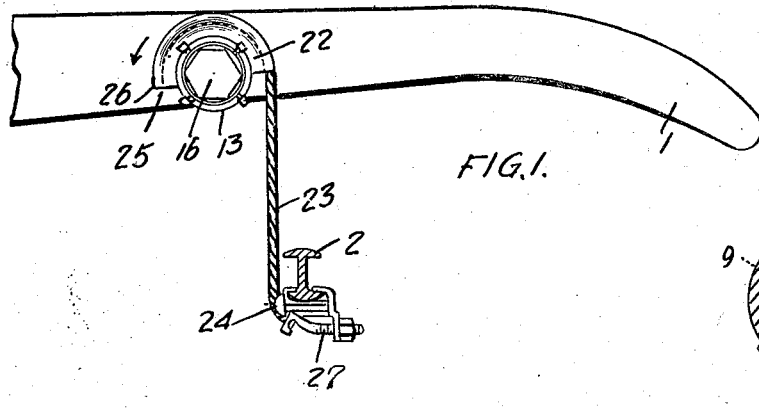
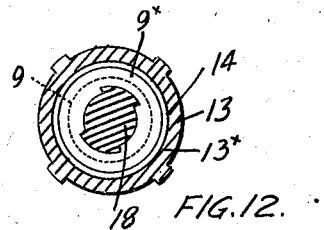
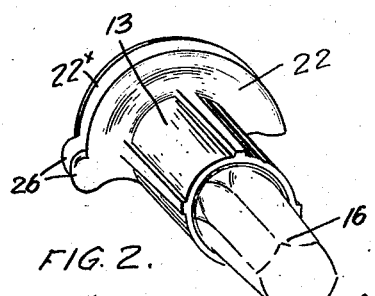
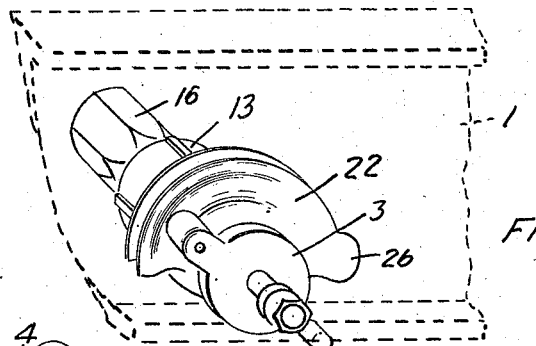
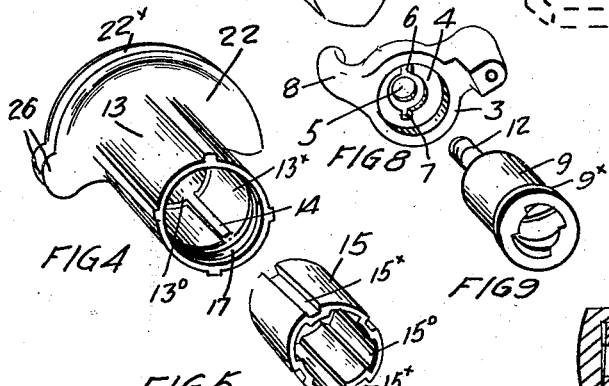
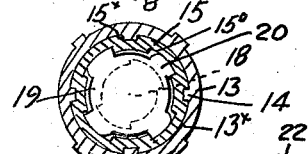
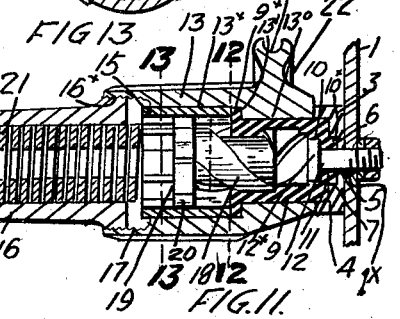
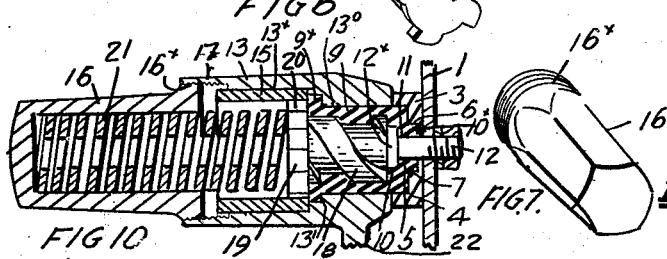
Inventor
F. W. Bull
by Fetherstonhaugh & Co.
Attys.

Patented Mar. 15, 1927.

1,620,945

UNITED STATES PATENT OFFICE.

FRANK WESLEY BULL, OF OSHAWA, ONTARIO, CANADA.

SHOCK ABSORBER.

Application filed May 17, 1926. Serial No. 109,751.

My invention relates to improvements in shock absorbers of the type disclosed in my prior United States Patent #1,527,115, dated February 17th, 1925. The object of the present invention is to devise in a shock absorber of the above type means for eliminating torsional strain on the interior parts, particularly the compression spring, and at the same time providing a closed container for oil in which all the operating parts actuate, and it consists essentially of the arrangement and construction of parts as hereinafter more particularly explained.

Fig. 1 is a side elevation of my device showing it applied to a portion of a chassis frame and an axle.

Fig. 2 is a perspective detail of my shock absorbing mechanism.

Fig. 3 is a perspective view of my device looking from the opposite side to that shown in Figure 1 and showing a portion of a chassis frame by dotted lines.

Figs. 4, 5, 6, 7, 8 and 9 are perspective views of the parts forming my shock absorbing mechanism separated apart.

Fig. 10 is a longitudinal sectional view through my device shown in the normal position.

Fig. 11 is a similar view to Figure 10 showing the parts in the position they assume when absorbing the shock.

Fig. 12 is a sectional view on line 12—12 Figure 11.

Fig. 13 is a sectional view on line 13—13 Figure 11.

In the drawing like characters of reference indicate corresponding parts in each figure.

1 indicates a portion of a chassis frame, and 2 an axle of an automobile. 3 is a casting which is cupped and provided with a centre recess 4, a centre orifice 5 and supplemental recesses 6 and 7 extending from the recess 4 at diametrically opposite points. 8 is a finger extending from the casting 3 and beneath the chassis frame illustrated by dotted lines in Figure 3 so as to prevent the rotation of the casting. 9 is an internally threaded sleeve provided at its inner end with a recess 10 and central orifice 11. 12 is a bolt extending through the orifice 11 and provided with a head $12^x$ fitting the recess 10. The bolt 12 extends through an orifice $1^x$ formed in the chassis frame 1. $10^x$ are projections formed integral with the sleeve 9 and adapted to fit within the supplemental recesses 6 and 7 of the casting 3. The opposite end of the sleeve 9 is provided with an annular flange $9^x$ for a purpose which will hereinafter appear.

13 is an outer cylindrical casing provided with an enlarged interior portion $13^x$ and a reduced interior portion $13^o$ forming a shoulder $13^1$.

The sleeve 9 fits within the reduced portion $13^o$, and the flange $9^x$ thereof fits within the enlarged portion $13^x$ against the shoulder $13^1$. The enlarged portion $13^x$ is provided with longitudinally extending ribs 14. 15 is a sleeve provided with external longitudinal grooves $15^x$ into which the ribs 14 fit. The sleeve 15 is also provided with internal longitudinal grooves $15^o$ the sleeve 15 is slipped into the enlarged portion $13^x$ of the casing 13 so that the ribs 14 enter the grooves $15^x$, the sleeve 15 bearing at its inner end against the flange $9^x$.

16 is a cap member provided with an externally threaded portion $16^x$ fitting the internally threaded portion 17 of the sleeve 13. 18 is an externally threaded cylinder, the thread of which engages with the internal thread of the sleeve 9. The threaded cylinder 18 is provided at its outer end with a head 19 provided with peripheral tooth like projections 20 fitting within the grooves $15^o$ of the sleeve 15. 21 is a spring bearing at its inner end against the head 19 and at its outer end against the inner face of the end wall of the cap 16 as clearly seen in Figures 10 and 11. 22 is a half pulley member formed integral with the casing 13. 23 is a cable extending around the groove $22^x$ of the half pulley 22 and secured at one end to such half pulley member as indicated at 26 either by forming a head 25 at the end of the cable 23 and compressing the lips 26 around the cable to clinch it in place or by any other suitable means desired. The opposite end of the cable is connected to the axle 2 by means such as a hook bolt 27 or by any other suitable means. I do not describe this construction in detail as any form of connection may be employed for connecting the cable 23 either to the front or rear axle of an automobile.

Having described the principal parts involved in my invention I will briefly describe the operation of the same.

Normally the spring 21 bears against the head 19 in the position shown in Figure 11. When the shock takes place the tendency is for the chassis frame and axle to approach one another releasing the tension on the cable 23, the spring thereby forcing the threaded cylinder 18 further into the cylinder 9, rotating the half pulley 22 in the direction of arrow see Figure 1. When the rebound takes place and the axle and chassis frame spread apart, the half pulley 22 is rotated in the opposite direction so that the externally threaded cylinder 18 is screwed out of the internally threaded cylinder 9 by means of the connection formed between the casing 13 and the head 19, the head passing directly forward and the teeth 20 sliding within the grooves 15° compressing the spring 21 until the shock is completely taken up, the spring then reacts to gradually take the parts back to their normal position.

It will, of course, be understood that the externally threaded cylinder 18 is non-revolvably connected to the cylinder 13 by means of the sleeve 15 which is in engagement with the cylinder 13 by means of the ribs 14 and grooves 15ˣ and with the head 19 by means of the grooves 15° and teeth 20.

It will thus be seen that during the operation of the device the whole mechanism formed by the casing 13, sleeve 15, externally threaded cylinder 18, spring 21 and cap 16 revolves as a single unit around the central stationary axis extending centrally through the sleeve 9 which is secured in a stationary position by means of the bolt 12 and casting 3, and thereby eliminating any tendency to torsional strain between the spring 21 and any other parts of the mechanism.

It will also be seen that the casing 13 with its cap 16 forms a closed container for oil so that the parts 18, 19 and 15 continually operate in oil.

What I claim as my invention is:

1. A shock absorber for vehicles comprising a stationary member secured to a vehicle frame and forming an axial support, an internal threaded cylindrical casing mounted upon such support to revolve therearound, a quadrant formed integral with the casing, a flexible connection adapted to be secured to the quadrant at one end and to a vehicle axle at the other end, a threaded cylinder engaging the internal thread of the support, connecting means whereby the cylinder is turned by the turning of the casing, and resilient means carried within the casing and adapted to resist the outward movement of the threaded cylinder as it is turned within the threaded support.

2. A shock absorber for vehicles comprising a supporting internally threaded sleeve member adapted to be secured to a vehicle frame, a casing revolvably mounted upon the sleeve, a quadant formed integral with the casing, a cap for the outer end of the casing, a compression spring held within the cap, an externally threaded cylinder operating within the internally threaded sleeve, and bearing against the inner end of the spring, means for coupling the externally threaded cylinder and casing to permit of the free longitudinal movement of the externally threaded cylinder within the casing as the casing and cylinder are revolved, and a flexible connection adapted to be secured at one end to a quadrant and at the opposite end to a vehicle axle.

3. A shock absorber for vehicles comprising an internally threaded cylindrical support adapted to be secured to a vehicle frame, a cylindrical casing mounted upon the support at one end and having longitudinally extending ribs at the opposite end, a sleeve provided with longitudinal grooves into which the aforesaid ribs fit and having internal longitudinal grooves, an externally threaded cylinder operating within the internally threaded support, radial projections at the outer end of the cylinder adapted to enter the internal longitudinal grooves of the sleeve, and a spring supported by the casing to resist the outward longitudinal movement of the cylinder.

4. A shock absorber for vehicles comprising an internally threaded cylindrical support adapted to be secured to a vehicle frame, a cylindrical casing mounted upon the support at one end and having longitudinally extending ribs at the opposite end, a sleeve provided with longitudinal grooves into which the aforesaid ribs fit, an externally threaded cylinder operating within the internally threaded support, connecting means between the externally threaded cylinder and the sleeve of the casing whereby they revolve in unison and yet permit of the longitudinal movement of the cylinder within the casing, and a compression spring resisting the outward movement of the cylinder.

5. In a shock absorber, the combination with the vehicle body and frame, of a cylindrical casing mounted on the frame and turnable around its longitudinal centre, an internally threaded stationary member within the casing, an externally threaded member meshing with the internally threaded member and turnable with the casing, a spring also turnable with the casing and resisting the longitudinal movement of the externally threaded member, and means for imparting a turning movement to the casing to correspond with the movement of the frame and body to and from each other.

FRANK WESLEY BULL.